(12) United States Patent
Morooka et al.

(10) Patent No.: US 6,604,679 B2
(45) Date of Patent: *Aug. 12, 2003

(54) PAYMENT MANAGEMENT METHOD AND SYSTEM USING AN IC CARD

(75) Inventors: Yoshitsugu Morooka, Kawasaki (JP); Tomohiro Umezawa, Kawasaki (JP); Masatoshi Hino, Zama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/184,916

(22) Filed: Jul. 1, 2002

(65) Prior Publication Data

US 2002/0166892 A1 Nov. 14, 2002

Related U.S. Application Data

(62) Division of application No. 09/648,614, filed on Aug. 28, 2000.

(30) Foreign Application Priority Data

Dec. 21, 1999 (JP) ............................................ 11-362308

(51) Int. Cl.[7] .............................................. G06F 17/60
(52) U.S. Cl. ....................... 235/379; 235/376; 235/492; 705/16; 705/69
(58) Field of Search ................................ 235/376, 379, 235/492; 705/17, 69

(56) References Cited

U.S. PATENT DOCUMENTS

| 4,839,504 | A | 6/1989 | Nakano | 235/379 |
|---|---|---|---|---|
| 5,144,115 | A | 9/1992 | Yoshida | 235/379 |
| 5,679,939 | A | 10/1997 | Watanabe | 235/379 |
| 5,796,092 | A | 8/1998 | Nagata et al. | 235/492 |
| 6,058,382 | A | 5/2000 | Kasai et al. | 705/41 |
| 6,070,794 | A | 6/2000 | Niwata et al. | 235/380 |
| 6,142,371 | A | 11/2000 | Oneda | 235/380 |

FOREIGN PATENT DOCUMENTS

| JP | 8-287201 | | 11/1996 | |
|---|---|---|---|---|
| JP | 10-091698 | * | 10/1998 | ........... G06F/19/00 |
| JP | 2000-306020 | | 11/2000 | |

* cited by examiner

Primary Examiner—Michael G. Lee
Assistant Examiner—Seung H Lee
(74) Attorney, Agent, or Firm—Mattingly, Stanger & Malur, P.C.

(57) ABSTRACT

A payment management method and system for performing suitable payment management, wherein a user of a credit IC card can store a transaction history in the IC card, collate the transaction history with charged amount data possessed by a credit company, quickly confirm a payment due date, judge an illegal demand for purchase by a non-authorized user, and know charged amounts claimed for the next time. The system includes the IC car which stores the transaction history data therein, a terminal device for accessing the data within the IC card, and a serve of the credit company connected to the terminal device via network for storing credit user data demanded by a credit member store therein. The terminal device stores transaction history data at the time of a purchase into the IC card, extracts the credit user data from the server of the credit company, and collates the transaction history data read out from the IC card with the credit user data extracted from the server. The terminal device displays the collated result.

11 Claims, 9 Drawing Sheets

FIG. 2

| TRANSACTION HISTORY | PAYMENT DUE DATE | PAYMENT STATE | OTHER | USER SEQUENCE NUMBER |
|---|---|---|---|---|
| ¥100, STORE A, JANUARY 1, 1999 | FEBRUARY, 1999 (TEMPORARY) | UNPAID | | 1 |
| ¥200, STORE D, JANUARY 1, 1999 | FEBRUARY, 1999 (TEMPORARY) | UNPAID | | 4 |
| ¥200, STORE B, JANUARY 5, 1999 | FEBRUARY, 1999 (TEMPORARY) | UNPAID | | 2 |
| ¥300, STORE C, FEBRUARY 1, 1999 | APRIL, 1999 (TEMPORARY) | UNPAID | | 3 |
| | | | | |

| TRANSACTION HISTORY | PAYMENT DUE DATE | PAYMENT STATE | OTHER | USER SEQUENCE NUMBER |
|---|---|---|---|---|
| ¥100, STORE A, JANUARY 1, 1999 | FEBRUARY, 1999 | PAID | | 1 |
| ¥200, STORE D, JANUARY 1, 1999 | FEBRUARY, 1999 | PAID | | 4 |
| ¥200, STORE B, JANUARY 5, 1999 | MARCH, 1999 | UNPAID | | 2 |
| ¥300, STORE C, FEBRUARY 1, 1999 | APRIL, 1999 (TEMPORARY) | UNPAID | | 3 |
| ¥400, STORE E, JANUARY 10, 1999 | MARCH, 1999 | UNPAID | UNKNOWN DEMAND (NOT INQUIRED) | 5 |
| | | | | |

| TRANSACTION HISTORY 401 | PAYMENT DUE DATE 402 | PAYMENT STATE 403 | OTHER 404 | USER SEQUENCE NUMBER 405 |
|---|---|---|---|---|
| ¥200, STORE B, JANUARY 5, 1999 | MARCH, 1999 | UNPAID | | 2 |
| ¥300, STORE C, FEBRUARY 1, 1999 | APRIL, 1999 (TEMPORARY) | UNPAID | | 3 |
| ¥400, STORE E, JANUARY 10, 1999 | MARCH, 1999 | UNPAID | UNKNOWN DEMAND (NOT INQUIRED) | 5 |
| | | | | |

FIG. 6

601 — PAID

| AMOUNT | PURCHASE DATE AND STORE | OTHER | USER SEQUENCE NUMBER |
|---|---|---|---|
| ¥100 | JANUARY 1, 1999, STORE A | | 1 |
| ¥200 | JANUARY 1, 1999, STORE D | | 4 |

602 — NEXT (MARCH) CHARGE

| AMOUNT | PURCHASE DATE AND STORE | OTHER | USER SEQUENCE NUMBER |
|---|---|---|---|
| ¥200 | JANUARY 5, 1999, STORE A | | 2 |

603 — CHARGE AFTER NEXT (MARCH)

| AMOUNT | PURCHASE DATE AND STORE | OTHER | USER SEQUENCE NUMBER |
|---|---|---|---|
| ¥300 | FEBRUARY 1, 1999, STORE C | APRIL EXPECTED | 3 |

604 — UNKOWN CHARGE

| AMOUNT | PURCHASE DATE AND STORE | OTHER | USER SEQUENCE NUMBER |
|---|---|---|---|
| ¥400 | JANUARY 10, 1999, STORE E | NOT INQUIRED | 5 |

WANT TO INQUIRE UNKNOWN CHARGE

[YES] 605  [NO] 606

FIG. 9

| TRANSACTION HISTORY | PAYMENT DUE DATE | PAYMENT STATE | USER SEQUENCE NUMBER |
|---|---|---|---|
| ¥100, STORE A, JANUARY 1, 1999 | FEBRUARY, 1999 | PAID | 1 |
| ¥200, STORE D, JANUARY 1, 1999 | FEBRUARY, 1999 | PAID | 4 |
| ¥200, STORE B, JANUARY 5, 1999 | MARCH, 1999 | UNPAID | 2 |
| ¥400, STORE E, JANUARY 10, 1999 | MARCH, 1999 | UNPAID | 5 |
| | | | |

901 / 902 / 903 / 905

PAYMENT MANAGEMENT METHOD AND SYSTEM USING AN IC CARD

This is a continuation application of U.S. Ser. No. 09/648,614, filed Aug. 28, 2000.

BACKGROUND OF THE INVENTION

The present invention relates to a payment management method and system which suitably use a credit card based on an intelligent card (which will also be referred to as IC card, hereinafter).

Conventionally, a user of a credit card, after using it, has checked a customer copy or receipt of the card received from one of credit member stores of the credit card against a debit note delivered from a credit company, and has judged the transaction history to be charged next time or after the next time and a wrong demand. Further, the user copy of the credit is disclosed in Japanese Patent Application NO. 7-85086 (JP-A-8-287201) a method for storing a transaction history in a storage in an IC card.

In the above method, the card user cannot know an amount claimed to be drawn next time before he accepts the bill from the card company. If the user lost the user copy, then he cannot know when and how much he used it and also cannot know an illegal use (if any) and an amount to be demanded after the next time because he cannot know contents of the debit note.

As means for solving such problems, there is already known such a service that a user can collate his amount claimed per month through telephone or Internet.

In the aforementioned claimed-amount collation service, however, the user searches for his transaction history stored in the card company, so it takes the user lots of time to input his card number and after the searching, he must troublesomely check a copy or as a receipt received upon its use against the transaction history. Even when the user such service, it takes lots of time to register his transaction history after the card company receives the transaction history from a credit card member store, for which reason the user may sometimes fails to find his transaction history by searching for it based on the above service.

SUMMARY OF THE INVENTION

It is therefore an object of the present invention to provide a payment management method and system which can solve the above problems in the prior art and wherein a transaction history is stored in an IC card so that a user of the IC credit card can collate the transaction history with demanded amount data possessed by a card company, can quickly confirm a demanded amount date, and can grasp payment due amounts claimed next time and after the next time to thereby realize suitable payment management.

In an aspect of the present invention, the above object is attained by a payment management method in a system which includes an IC card having a storage means for storing transaction history data therein, a terminal device for accessing the data within the IC card, and a server in a card company connected with the terminal device via a network and having a storage means for storage of credit user data demanded by a credit card member store. The payment management method includes steps of storing into the storage means within the IC card the transaction history data when the user paid in the credit member store with use of the IC card, reading out the transaction history data from the IC card with use of the terminal device, reading out the credit user data from the server storage means with use of the terminal device, collating the transaction history data read out from the IC card with the credit user data read out from the server, and displaying its collated result on the terminal device.

The step of displaying the collated result may include a step of displaying the collated result as divided into a charged amount claimed next time and an charged amount claimed after the next time.

The transaction history data within the IC card and the credit user data within the server may include demand date data indicative of a date on which the card user is to be demanded and payment state data indicative of whether or not the payment is finished, such that the demand date data and payment state data of the transaction history data within the IC card can be updated according to the credit user data of the server extracted by the terminal device.

Upon collation, when the transaction history data is present in the storage means of the IC card but the credit demand data corresponding to the transaction history data is not present in the storage device connected to the server, data indicative of 'not demanded' may be added to the transaction history data and its collated result may be displayed. Upon collation, further, when the credit demand data is present in the storage device connected to the server but the transaction history data corresponding to the credit demand data is not present in the storage means of the IC card, the transaction history data corresponding to the credit demand data may be newly added to the storage device of the IC card, data indicative of 'unknown billing data' may be added to the added transaction history data, and its collation result may be displayed.

The payment management method of the present invention may further include a step of displaying at least the transaction history data of already paid or of unknown demand in the transaction history data of the storage means of the IC card by means of the terminal device, and deleting these transaction history data.

The payment management method of the present invention may further include a step of issuing an inquiry relating to the transaction history data of the unknown demand to the credit company by the user who give an instruction on a display screen showing the collated result.

In another aspect of the present invention, there is provided a payment management method in a system which includes an IC card having a storage means for storing transaction history data therein, a terminal device for accessing the data within the IC card, and a server of a credit company having storage means connected to the terminal device via a network for storing credit user data demanded by a credit member store. The payment management method includes steps of storing into the storage means of the IC card the transaction history data when a card user paid in the credit member store with use of the IC card, reading out the transaction history data from the IC card by means of the terminal device, transmitting the credit user data from the server of the credit company to the terminal device, receiving the transmitted credit user data at the terminal device, collating the transaction history data read out from the IC card with the received credit user data, and displaying its collated result on the terminal device.

The step of reading out the transaction history data from the IC card by means of the terminal device may include a step of storing the read transaction history data into the storage means of the terminal device; and the step of collating the transaction history data read out from the IC card at the terminal device with the credit user data extracted from the server may collate the transaction history data stored in the storage means of the terminal device with the credit user data extracted from the server.

In a further aspect of the present invention, there is provided a payment management system which uses an IC card having therein a storage means for storage of transaction history data to manage payment data relating to user's payment conducted in a credit member store. The payment management system includes a means for reading out the transaction history data from the IC card, a means for acquiring the credit user data from the server of the credit company for management of the credit user data about payment based on the IC card, a means for collating the transaction history data read out from the IC card with the acquired credit user data to create a collated result, and means for displaying the created collated result.

The IC card in the present invention, which is used for credit purchase in the credit member store, has a communication device and a storage device for holding the transaction history data obtained through the communication device therein, the data containing the name of the member store used at the time of the credit purchase and a purchased amount therefor.

A processor also included in the IC card compares own credit data obtained through the communication device and network with the aforementioned transaction history data, and when a record different from the history data is present in the credit data, records the different record in the storage device as the transaction history data.

Also included in the transaction history data are data on a payment due date for the transaction or purchased amount and data indicative of a payment state for the purchased amount.

Further, a program for use in the terminal device in the present invention is provided as fixed to a recording medium which follows. That is, there is provided a recording medium for holding therein an executable program read into a terminal device which can be connected to another storage device via a network to read and write data from and to an IC card used as a credit card. The program includes steps of storing transaction history data when a user of the IC card used it in a credit member store for his payment into a storage means within the IC card, reading out the transaction history data from the IC card, extracting credit user data about the IC card being stored in the storage device via the network from the storage device, collating the transaction history data read out from the IC card with the credit user data, and displaying its collated result on the terminal device.

If some piece of data is present not in the transaction history data but present in the credit user data in the collating step, an addition of the third data to the transaction history data is displayed in the displaying step.

BRIEF DESCRIPTION OF THE DRAWINGS

FIG. 2 shows an exemplary transaction history table stored in a storage device within an IC card;

FIG. 3 shows another exemplary transaction history table stored in the storage device of the IC card;

FIG. 4 shows a further exemplary transaction history table stored in the storage device of the IC card;

FIG. 6 is an exemplary display screen showing a result of the transaction history table after read out from the IC card;

FIG. 9 shows an example of the demanded amount data stored in the storage device connected to a server of the card company.

DESCRIPTION OF THE EMBODIMENTS

Figure 1:
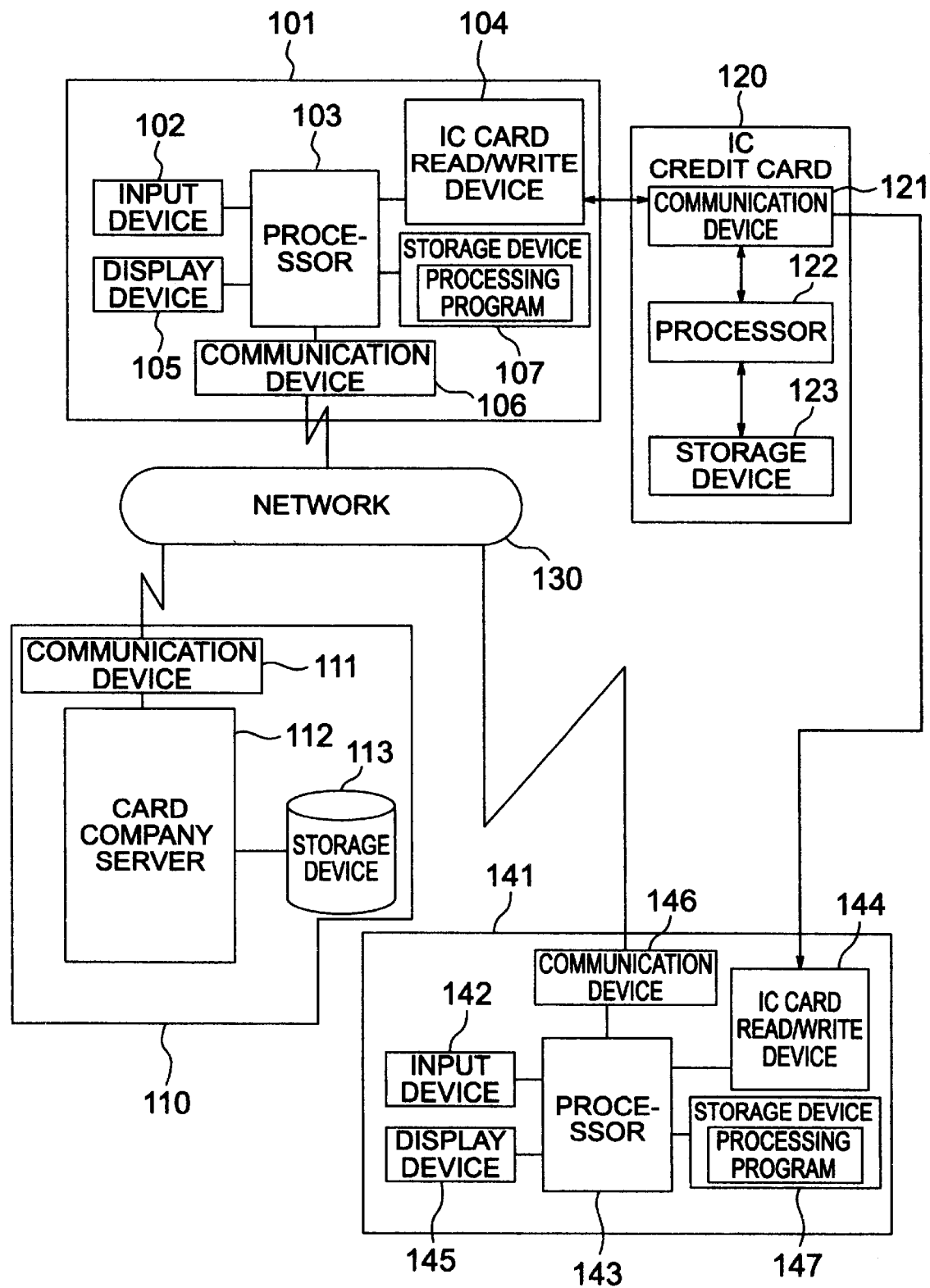
FIG. 1 is a block diagram of an arrangement of a payment management system in accordance with an embodiment of the present invention, including an IC card.

Explanation will first be made as to reference numerals used in embodiments of the present invention.

Reference numeral 101 denotes a card processor, numeral 102 denotes an input device, 103 a processor, 104 an IC card read/write device, 105 a display device, 106 a communication device, 107 a storage device, 120 an IC card, 121 a communication device, 122 a processor, 123 a storage device, 110 a card company system, 111 a communication device, 112 a card company server, 113 a storage device, 141 an IC card processor, 142 an input device, 143 a processor, 144 an IC card read/write device, 145 a display device, 146 a communication device, 147 a storage device, 130 a network.

Embodiments of the present invention will be explained in detail with reference to accompanying drawings.

FIG. 1 is a block diagram of an arrangement of a payment management system in accordance with an embodiment of the present invention, including an IC card 120. The system includes a card processor 101 installed in a credit member store for reading and writing data within the IC card, an input device 102, a processor 103, an IC card read/write device 104, a display device 105, a communication device 106 and a storage device 107. The IC card 120 includes a communication device 121, a processor 122 and a storage device 123. A card company system 110 for providing demanded amount data possessed by a card company to users, includes a communication device 111, a card company server 11 and a storage device 113. An IC card processor 141 for reading and writing data within the IC card, is used by credit card users. The IC card processor 141 includes an input device 142, a processor 143, an IC card read/write device 144, a display device 145, a communication device 146 and a storage device 147. A network 130 is used for communication with the card processor 101, card company system 110 and IC card processor 141 for use by the users.

FIG. 2 is an example of a transaction history table stored in the storage device 123 of the IC card 120, which shows a transaction history 201 indicative of a purchased or charged amount, transaction or purchase date and transaction or purchase store, payment due date data 202 indicative of a demanded date (timing of debiting user's bank account) for the purchased amount, payment state data 203 indicative of a state of paid or unpaid (debited or not debited), other data 204 indicative of other user data, and user sequence number (ID (identifier) of the transaction history) 205.

FIG. 3 is an example of a transaction history table updated after the transaction history table stored in the storage device 123 of the IC card 120 is collated with the demanded amount data stored in the storage device 113 connected to the card company server 112 of the credit company. The updated table shows a transaction history 301 indicative of a purchased amount, purchase date and purchase store, payment due date data 302 indicative of a date of payment for the purchased amount, payment state data 303 indicative of a state of paid or not paid, other data 304 indicative of other user data, and a user sequence number 305.

FIG. 4 is an example of the transaction history table within the IC card 120 after 'paid' items of the payment state data in the transaction history table of FIG. 3 are deleted and then the table is updated. The updated table shows a transaction history 401 indicative of a purchased amount, purchase date and purchase store, payment due date data 402 indicative of a date of payment for the purchased amount, payment state data 403 indicative of a state of paid or not paid, other data 404 indicative of other user data, and a user sequence number 405.

Figure 5:
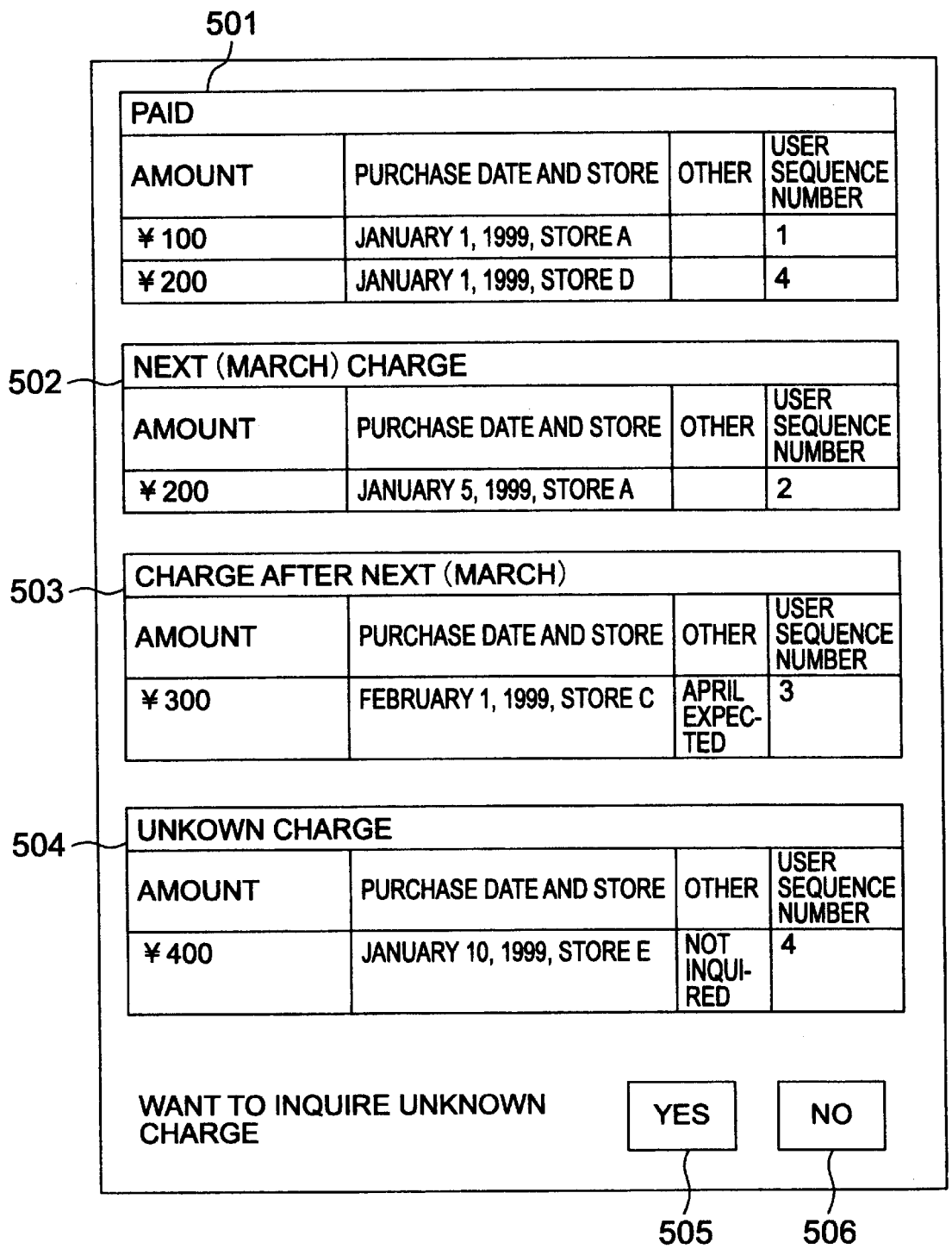
FIG. 5 is an exemplary display screen showing a result of collation of the transaction history table within the IC card with demanded amount data stored in a storage device of a card company system.

FIG. 5 is an example of a display screen showing a result of collation of the transaction history table within the IC card 120 with demand data stored in the storage device 113 of the card company system, in which reference numeral 501 denotes a transaction history already paid, numeral 502 denotes an amount to be paid next time, 503 denotes an amount to be paid after the next time, 504 denotes a unknown user-demanded amount (unknown demand) which is included in the demand data in the storage device 113 and is not present in the transaction history table within the IC card 120, 505 and 506 denote buttons 505 and 506 used when the user wants to inquire the unknown demand of the credit company respectively.

FIG. 6 is an example of a display screen showing a result after the transaction history table within the IC card 120 is read out offline, in which reference numeral 601 denotes a transaction history already paid, numeral 602 denotes an amount to be paid next time, 603 denotes an amount to be paid after the next time, 604 denotes a unknown user-demanded amount (unknown demand), 605 and 606 denote buttons 605 and 606 used when the user instructs to delete the unknown demand and paid history in the transaction history table of the IC card 120 from the transaction history table respectively.

FIG. 9 is an example of demand data (credit purchase data) stored in the storage device 113 connected to the card company server 112, in which reference numeral 901 denotes a transaction history indicative of a purchased amount, purchase date and purchase store, numeral 902 denotes payment due date data indicative of a date of payment for the purchased amount, 903 denotes payment state data indicative of a state of paid or not paid, and 905 denotes a user sequence number.

Figure 7:
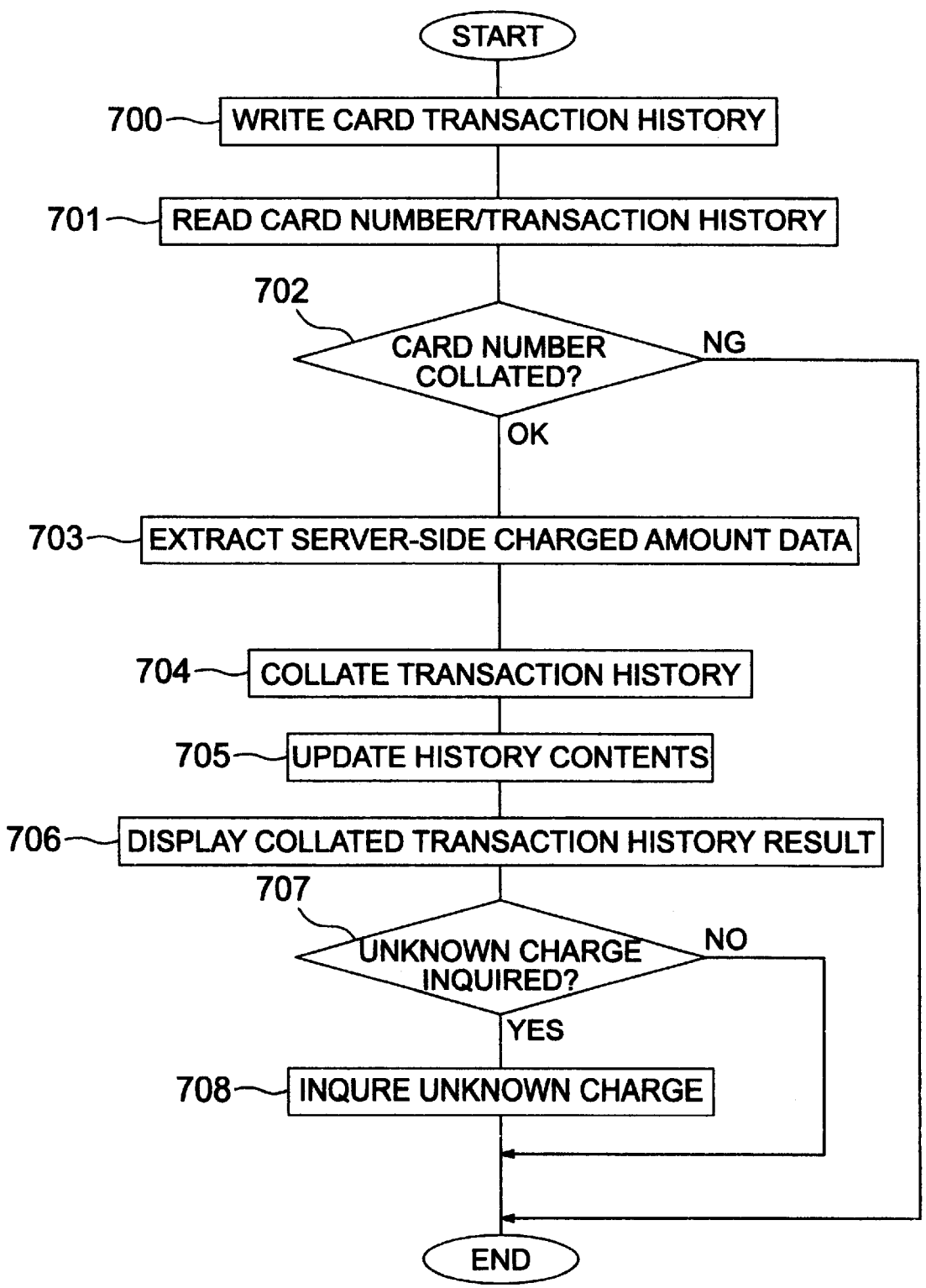
FIG. 7 is a flowchart showing a procedure of operations when a user of the IC card collates the transaction history table of the IC card with the demand amount data of the card company.

FIG. 7 is a flowchart showing a procedure of operations when the user collates the transaction history table of the IC card with the charged amount data of the credit company in the system of the present embodiment.

When the card user first buys and pays for it with the IC card 120 in the credit member store, the card member store writes the transaction history 201, payment due date data 202, other data 204 and user sequence number 205 into the storage device 123 of the IC card 120 with use of the card processor 101 (step 700). At this time, 'not paid' indicative of 'unpaid' is written into the payment state data 203 of the transaction history item. Further, 'temporary' payment due date as an expectancy is written into the payment due date data 202. The '(temporary)' in the payment due date (temporary) in FIG. 2 means the payment due date is temporary. These data generated in the credit member store are transmitted as charged amount data to the card company system 110 from the card processor 101. In the card company system 110, these data are written in the storage device 113 as shown in FIG. 9. In this connection, since a payment due date can be determined for the received data in the card company system 110, the determined data is written as the payment due date data 902.

After the operation of the step 700 upon payment in the credit member store, the card user can confirm and rearrange the contents of the IC card 120 and also can collate it with data of the card company. A flow of such operations in the IC card processor 141 is shown by steps 701 to 708. Some of credit member stores may be not installed with such an card processor 101. When the card user buy and pays for it with his card in such a store, the user himself can look at his customer copy or receipt and can conduct the operation (writing of data into the IC card 120) of the step 700 using the IC card processor 141.

Next, when the card holder inserts the IC card 120 into the IC card processor 141 and then conducts a predetermined operation, the IC card processor 141 reads out the transaction history 201, payment due date data 202, payment state data 203, other data 204 and user sequence number 205 (FIG. 2) as well as the card number (credit number) previously registered in the IC card 120, from the storage device 123 of the inserted IC card 120 (step 701). The card number is an identifier for identifying the IC card 120.

The IC card processor 141 then communicates via its communication device 146 and network 130 with the credit company to judge whether or not the card number of the IC card is one of numbers of credit cards issued from the credit company on the basis of data stored in the storage device 113 of the credit company. When the IC card processor 141 confirms that the card number is confirmed as one of numbers of the credit cards issued from the credit company, the processor proceeds to the next step 703, whereas, when determining that the card number is not one of numbers of the issued credit cards, the processor terminates its operation (step 702).

Subsequently the IC card processor 141 searches the storage device 113 having company demand data stored therein for a charged amount data (FIG. 9) corresponding to the corresponding card number and extracts from the storage device 113 the associated transaction history 901, payment due date data 902, payment state data 903 and user sequence number 905 (step 703).

The IC card processor 141 compares the data within the IC card 120 read out at the step 701 with the associated data of the card company for each user number (step 704), and updates the transaction history table (FIG. 2) within the IC card 120 (step 705), which will be detailed below.

First of all, when the user sequence number 205 read out at the step 701 has the same record as in the user sequence number 905 extracted at the step 703, the IC card processor 141 compares the user histories 201 and 901 for the same user sequence number record; whereas, when the user sequence numbers fail to have the same record, the IC card processor 141 writes data indicative of the fact that the user histories are different in the other data 204. Next, the payment due date data 202 and 902 are compared for the same user sequence number so that a difference therebetween causes the contents of the payment due date data 902 to be written into the payment due date data 202. The payment state data 203 and 903 are then compared so that a difference therebetween causes the contents of the payment state data 903 to be written into the payment state data 203. A user sequence number present not in the user sequence number 205 of the transaction history table within the IC card 120 is present in the user sequence number 905 of the record extracted at the step 703, the transaction history 901, payment due date data 902, payment state data 903 and user sequence number 905 of the user sequence number are written as a new record into the associated transaction history 201, payment due date data 202, payment state data 203 and user sequence number 205 in the transaction history table of the IC card 120. Further 'unknown demand (not inquired)' is written into the other data 204. An example of results thus written and updated is shown in FIG. 3. When there is one of the user sequence numbers read out at the step 701 which is not present in the user sequence number 905 of the record extracted from the server at the step 703, 'not demanded' is written into the other data 204 of the associated record of the transaction history table within the IC card 120.

The IC card processor 141 calculates a total sum amount from the results of the collation and updating at the steps 704 and 705, displays the resultant sum amount on the display device 145 of the IC card processor 141, and stores the collated result in the storage device 147 of the IC card processor 141 (step 706). FIG. 5 shows an exemplary display screen of the collated transaction history result.

In the display screen (FIG. 5) of the collated transaction history result, next, when the user wants to inquire the unknown demand or charge of the card company, the user pushes the YES button 505 from the input device 142 of the IC card processor 141 (step 707). Pushing of the YES button 505 causes the user sequence number (user sequence number 5 in the example of FIG. 5) of the unknown demand to be transmitted from the communication device 146 of the IC card processor 141 via the network 130 to the credit company. Thereafter the IC card processor 141 updates the other data 204 of the transaction history table stored in the storage device 123 of the IC card 120 to 'unknown demand (already inquired)' (step 708), thus terminating its operation. When the user does not want to inquire the unknown demand of the credit company and thus when he pushes the NO button 505 from the input device 142 of the IC card processor 141 (step 707), this causes the IC card processor 141 to terminate its operation. In this connection, a similar operation may be realized not only for the 'unknown demand' but also 'not demanded'.

Figure 8:
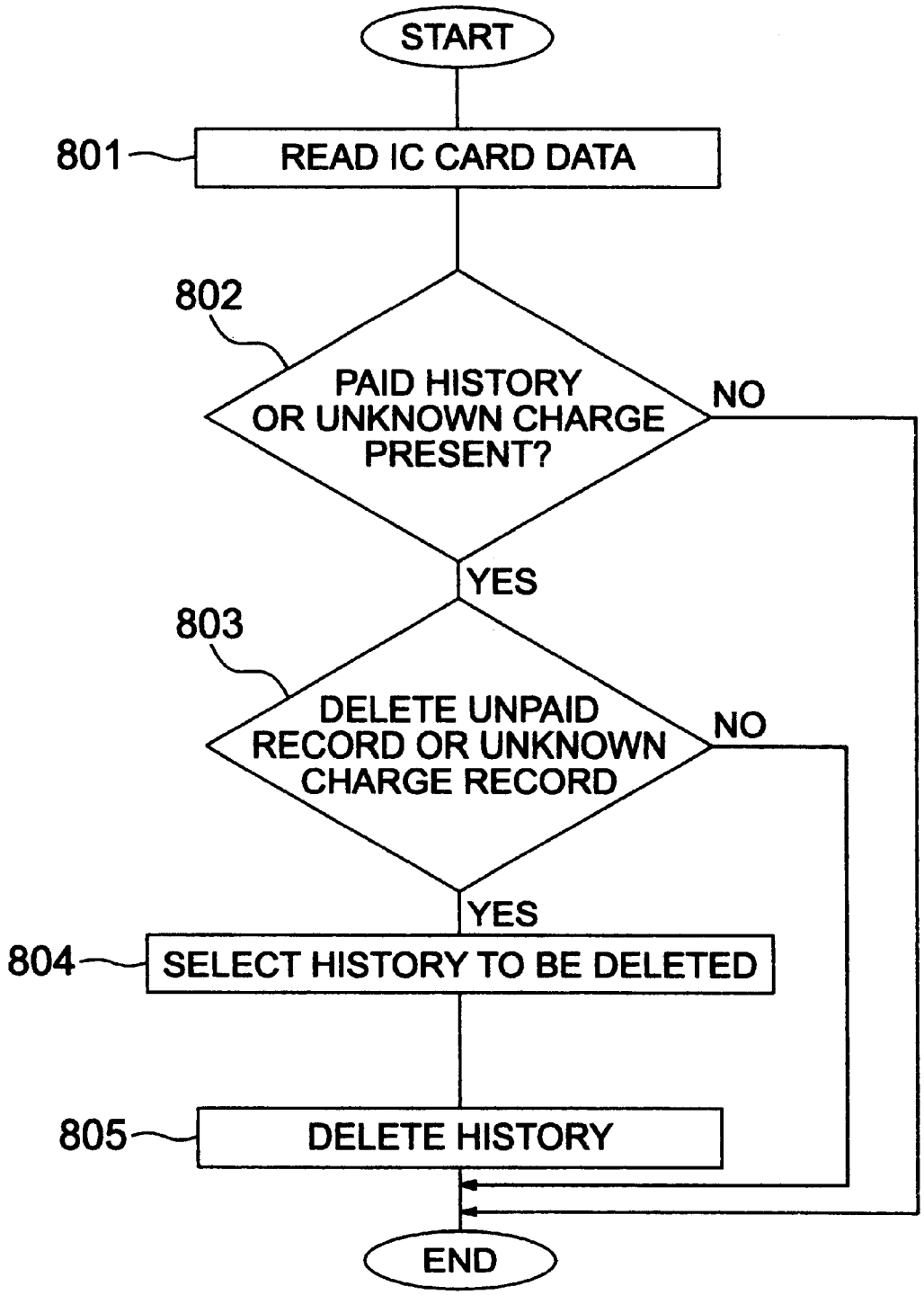
FIG. 8 is a flowchart showing a procedure of operations when the user wants to deletes a record of the transaction history table stored in the storage device of the IC card.

FIG. 8 is a flowchart showing a procedure of operations when the user wants to delete a record of the transaction history table stored in the storage device 123 of the IC card 120 in the system of the present embodiment. The operation of the flowchart starts with cardholder's insertion of the IC card 120 into the IC card processor 141 to perform predetermined operations.

First of all, the IC card processor 141 reads out the transaction history table from the storage device 123 of the IC card 120 (step 801). It is now assumed that the IC card processor 141 read out such a transaction history table as shown in FIG. 3.

The IC card processor 141 then searches the read-out transaction history table for a record of the payment state data 303 written as 'paid' or a record of the other data 304 written as 'unknown demand' (step 802). When failing to find such a record, the IC card processor 141 terminates its operation. When finding a record of the 'paid' or 'unknown demand', the IC card processor 141 displays the transaction history table read out at the step 801 on the display screen to inquire whether to delete the record of the paid history or unknown demand of the card user. FIG. 6 is an exemplary display of the read-out result of the transaction history table in the case of presence of the paid or unknown demand record.

The card user pushes a YES button 605 or a NO button 606 on such a display screen as shown in FIG. 6 (step 803). When the card user does not want to delete the paid history record nor the unknown demand record, the user pushes the NO button 606 from the input device 142 of the IC card processor 141, whereby the IC card processor 141 terminates its operation. When the card user wants to delete the paid history record or unknown demand record, the user pushes the YES button 605 from the input device 142 of the IC card processor 141 and selects the record to be deleted from the input device 142 (step 804), whereby the IC card processor 141 deletes the selected record and stores an updated transaction history table into the storage device 123 of the IC card 120 (step 805). FIG. 4 shows a state after the paid history record was deleted from the state of FIG. 3.

A modification of the foregoing embodiment will next be explained. Although data for collation with the transaction history table of FIG. 2 stored in the storage device 123 of the IC card 120 is stored in the storage device 113 connected to the card company server 112 of the credit company in the foregoing embodiment of the present invention, the credit company may previously transmit, by means of electronic mail, the charged amount data and credit card number of FIG. 9 stored in the storage device 113 connected to the server of the credit company may to an electronic mail address of the credit card user via the communication device 111 and network 130 so that, after the IC card processor 141 receives the charged amount data and credit card number of FIG. 9 via the communication device 146, the IC card processor 141 stores the charged amount data and credit card number of FIG. 9 into the storage device 147 of the processor 141, whereby, as in the foregoing embodiment of the present invention, the credit card user can collate the transaction history table and credit card number of FIG. 2 stored in the storage device 123 of the IC card 120 with the charged amount data and credit card number of FIG. 9 stored in the storage device 147 of the IC card processor 141.

A second modification of the foregoing embodiment will be explained. Although the transaction history table of FIG. 2 stored in the storage device 123 of the IC card 120 is collated with the charged amount data of FIG. 9 stored in the storage device 113 connected to the card company server 112 of the credit company in the foregoing embodiment, the IC card processor 141 may previously store the transaction history table and credit card number of FIG. 2 stored in the storage device 123 of the IC card 120 into the storage device 147 of the IC card processor 141, whereby, as in the foregoing embodiment, the user can collate the transaction history table and credit card number of FIG. 2 stored in the storage device 147 of the IC card processor 141 with the charged amount data an credit card number of FIG. 9 stored in the storage device 113 connected to the card company server 112 of the credit company. Thereby, for example, the card user can take the function of the present invention into housekeeping software being used by the card user to realize the aforementioned collation on the housekeeping software.

A third modification of the foregoing embodiment will be explained. When the IC card processor 141 has no function of updating data of the transaction history table within the storage device 123 of the IC card 120 in the foregoing embodiment, the transaction history table of the storage device 123 of the IC card 120 may not be updated so that, as in the foregoing embodiment, the transaction history table of the IC card 120 can be collated with the charged amount data of the storage device 113 connected to the card company server 112, its collated result may be displayed and be stored into the storage device 147 of the IC card processor 141.

In accordance with the foregoing embodiment and its modifications, since the transaction history data relating to user's use is sequentially checked against the credit charged amount data possessed by the credit company, the card user can quickly know how much and when the user is charged by the credit company. Further, the user also can quickly know the charged amount data of the credit card actually used by the user as well as wrongly-registered or illegally registered charged amount data of the credit card. In addition, since deletion of the transaction history data of 'paid' enables the storable capacity of the IC card to be kept at a suitable value, so that, when the user wants to use the credit card, he can write always new transaction history data into the card in credit card member stores.

In accordance with the present invention, as has been explained in the foregoing, since the transaction history data of the IC card is automatically collated with the charged amount data possessed by the credit company, the user of the credit card can quickly confirm its due-payment date, judge an undue charge for a purchase not actually done by the user, and can know charged amount data to be paid after the next time.

What is claimed is:

1. A payment management method for collating transactions utilizing a system which includes an IC card for storing transaction history information in accordance with a transaction utilizing the IC card and transaction discrimination information for discriminating said transaction in coordination therein, and a server for managing said IC card and payment accompanied by the transaction utilizing said IC card, said method comprising the steps of:

storing transaction discrimination information for discriminating transactions at each transaction in said IC card, and storing transaction discrimination information for discriminating each transaction and information indicating contents of each transaction in the server of a card company;

reading out card discrimination information for discriminating said IC card and said transaction history information from said IC card;

reading out transaction history information corresponding to said card discrimination information read out of a recording portion of a card company apparatus;

collating aid transaction history information read out of said IC card and transaction history information stored in said server for each of said transaction discrimination information; and outputting he result of the collating.

2. A payment management method as set forth in claim 1, further corn rising the step of displaying the collated result on a display device.

3. A payment management method as set forth in claim 2, wherein said step of displaying the collated result includes a step of displaying the collated result as divided into a charged amount claimed next time and a charged amount claimed after the next time.

4. A payment management method as set forth in claim 2, wherein, upon the collation, when credit demand data is present in the server but the transaction history information corresponding to the credit demand data is not present in the IC card, the transaction history information corresponding to the credit demand data is newly stored in the IC card, data indicative of an unknown demand is added to the added transaction history information, and the collated result is displayed.

5. A payment management method as set forth in claim 4, further including the steps of displaying at least the transaction history information of already paid or of the unknown demand in the transaction history information stored in the IC card, and then deleting the transaction history information.

6. A payment management method as set forth in claim 4, further including a step of issuing an inquiry relating to the transaction history data of the unknown demand to the card company by the user who gives an instruction on a display screen showing the collated result.

7. A payment management method for collating transactions utilizing a system which includes an IC card for storing transaction history information in accordance with a transaction utilizing the IC card, transaction discrimination information for discriminating said transaction, and transaction related information including demand date information for indicating a payment date concerned with said transaction in coordination therein, and a server for managing said IC card and payment accompanied by the transaction utilizing said IC card, said method comprising the steps of:

storing transaction discrimination information for discriminating transactions at each transaction in said IC card, and storing transaction discrimination information for discriminating each transaction and information indicating contents of each transaction in the server of a card company;

reading out card discriminating information for discrimination said IC card and said transaction related information from said IC card;

reading out transaction related information corresponding to said card discriminating information read out from said recording portion of a card company apparatus;

collating transaction related information read out of said IC card and transaction related information stored in said server for each of said transaction discrimination information; and outputting he result of said collating.

8. A payment management method as set forth in claim 7, wherein the transaction history information in the IC card and credit user data in the server include demand date data indicative of a date on which the card user is to be demanded, and payment state data indicative of whether or not the payment is finished, and wherein the demand date data and payment state data of the transaction history information in the IC card are updated according to the credit user data of said server.

9. A payment management method as set forth in claim 8, further including the steps of displaying at least the transaction history information of already paid or of an unknown demand in the transaction history information stored in the IC card, and then deleting the transaction history information.

10. A payment management method as set forth in claim 8, further comprising the step of displaying the collated result on display device.

11. A payment management method as set forth in claim 10, wherein, upon said collation, when the transaction history information is present in said IC card but credit demand data corresponding to the transaction history information is not present in the storage device connected to the server, data indicative of 'not demanded' is added to the transaction history information and the collated result is displayed.

* * * * *